(12) United States Patent
Chalkowsky

(10) Patent No.: US 7,044,041 B1
(45) Date of Patent: May 16, 2006

(54) MITER SAW

(75) Inventor: Peter Chalkowsky, Bel Air, MD (US)

(73) Assignee: Black & Decker Inc., Newark, DE (US)

( * ) Notice: Subject to any disclaimer, the term of this patent is extended or adjusted under 35 U.S.C. 154(b) by 438 days.

(21) Appl. No.: 09/524,076

(22) Filed: Mar. 13, 2000

(51) Int. Cl.
*B23D 19/00* (2006.01)

(52) U.S. Cl. .................. 83/471.3; 83/473; 83/477.1

(58) Field of Classification Search ............ 83/471.3, 83/473, 477.1, 477.2, 490, 581, 564
See application file for complete search history.

(56) References Cited

U.S. PATENT DOCUMENTS

| | | | | |
|---|---|---|---|---|
| 3,540,338 A | * | 11/1970 | McEwan .............. | 83/491 |
| 3,672,251 A | | 6/1972 | Jagers | |
| 4,028,975 A | * | 6/1977 | Bennett .............. | 83/397 |
| 4,245,533 A | * | 1/1981 | Batson .............. | 83/490 |
| 4,265,154 A | * | 5/1981 | Batson .............. | 83/468 |
| 4,335,637 A | * | 6/1982 | Kaltenbach .......... | 83/452 |
| 5,046,390 A | * | 9/1991 | Sasaki .............. | 83/471.2 |
| 5,063,802 A | * | 11/1991 | Shiotani et al. ...... | 83/98 |
| 5,146,826 A | * | 9/1992 | Shiotani et al. ...... | 83/468.2 |

* cited by examiner

*Primary Examiner*—Allan N. Shoap
*Assistant Examiner*—Ghassem Alie
(74) *Attorney, Agent, or Firm*—Adan Ayala

(57) ABSTRACT

The miter saw includes a base assembly, a rotatable table rotatably connected to the base assembly, the table having a table plane, a fence connected to the base assembly and having a fence plane, a saw assembly including a motor and a blade driven by the motor, the blade having a radius and a blade center, and a pivot arm pivotally attached to the table and pivotally supporting the saw assembly about a first axis substantially parallel to the table plane, allowing a user to plunge the blade below the table plane, wherein the distance between the first axis and the table plane is about 0.472 times the radius. Also, the distance between the first axis and the fence plane is about 1.45 times the radius, and the distance between the first axis and the blade center is about 1.882 times the radius. In addition, the distance between the blade center and the table plane is about 0.57 times the radius when the blade is plunged below the table plane.

11 Claims, 5 Drawing Sheets

US 7,044,041 B1

MITER SAW

FIELD OF THE INVENTION

This invention relates generally to miter saws.

BACKGROUND OF THE INVENTION

A typical miter saw has a base assembly, including a rotatable table rotatably connected to the base assembly, a saw assembly including a motor and a blade driven by the motor, a pivot arm pivotally attached to the base assembly and supporting the saw assembly, allowing a user to move the saw assembly towards and away from the base assembly for cutting a workpiece. A miter saw can be used for cutting crown molding, wood beams, etc.

Typically, the cutting capacity of a miter saw is limited because of its blade size and/or geometry. For example, most currently available ten-inch non-sliding miter saws can cut nominal 4" by 4" and 2" by 6" wood beams. However, these miter saws cannot cut some of the larger boards, which are about six inches wide, true size. Accordingly, if a user wants to cut a board that is larger than the cutting capacity of the miter saw, the user would need to purchase a larger miter saw, with a larger blade, higher weight, higher price, etc. Alternatively, the user could use a radial arm saw or sliding miter saw. But these are also more expensive, etc.

SUMMARY OF THE INVENTION

In accordance with the present invention, an improved miter saw is employed. The miter saw includes a base assembly, a rotatable table rotatably connected to the base assembly and having a plane, a saw assembly including a motor and a blade driven by the motor, and a pivot arm pivotally attached to the table and supporting the saw assembly, allowing a user to plunge the blade below the table plane, wherein the area of the blade below the table plane is between about 14.4% and about 50% of the blade area.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

Figure 1:
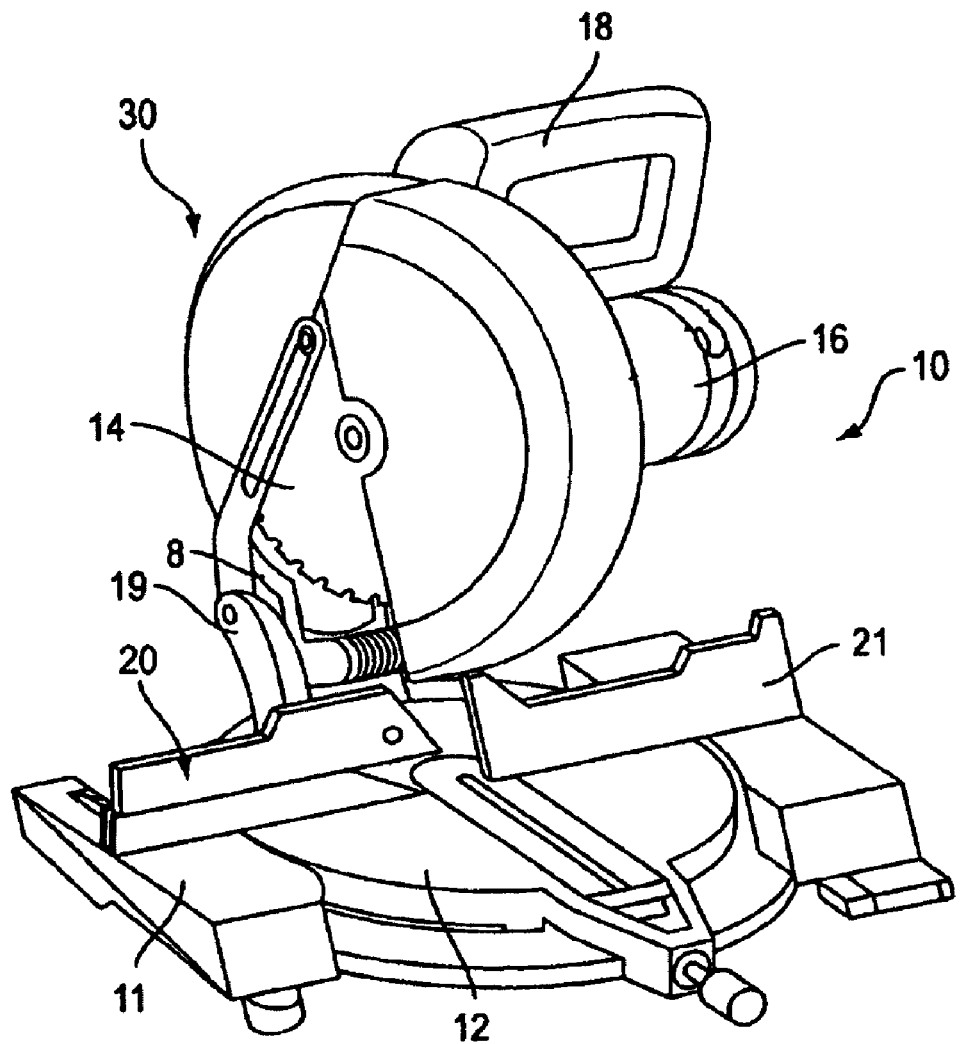
FIG. 1 is a perspective view of a miter saw according to the present invention.

The invention is now described with reference to the accompanying figures, wherein like numerals designate like parts. Referring to FIGS. 1–5, a miter saw 10 has a base assembly 11. Base assembly 11 preferably includes a rotatable table 12 rotatably connected to the base assembly 11, which allows a user to change the saw blade miter angle as is well known in the art.

In addition, the miter saw 10 has a saw assembly 30 including a motor 17 (shown in broken lines) and a blade 14 driven by the motor 17. Preferably saw assembly 30 is pivotally connected to base assembly 11 (and/or table 12) via arm 8 to allow the user to move the blade 14 towards table 12 in a chopping action. Arm 8 may be connected to pivot joint 19 which allows the saw assembly 30 be pivoted about axis A, so as to pivot saw assembly 30 downwardly for cutting a workpiece, and/or about bevel axis B, so as to change the bevel angle between the blade 14 and the plane of base assembly 11 and/or table 12.

Preferably, the motor 17 is covered by housing 16. A handle 18 may be connected to the housing 16. Handle 18 preferably has a first horizontal handle 18H for enabling a user to pivot the saw assembly 30 downwardly. In addition, handle 18 may have a second horizontal handle 18C substantially perpendicular to the first handle 18H for enabling a user to carry the miter saw 10.

A sliding fence assembly 20 may be disposed on the left side of miter saw 10. Preferably fence assembly 20 is disposed on the left side 11L of base assembly 11. Persons skilled in the art are referred to U.S. Pat. No. 5,297,463, entitled "Adjustable fence for compound miter saw", which is hereby incorporated in whole by reference.

A fence 21 may also be disposed on the right side of miter saw. Preferably fence 21 is disposed on the right side 11R of base assembly 11. Preferably fence 21 is coplanar with fence assembly 20.

As mentioned above, the saw assembly 30 is pivotable about an axis A. The distance between the axis A and the plane 11P of the base assembly 11 and/or table 12 is distance ABP. Preferably the distance ABP is about 0.472 times the radius R of blade 14. In a ten-inch miter saw having a blade of about 5 inches radius, the distance ABP is about 2.36 inches. Similarly, the distance between the axis A and the plane 20P is distance AFP. Preferably the distance AFP is about 1.45 times the radius R. Accordingly, in a ten-inch miter saw, the distance AFP is about 7.25 inches.

Furthermore, it is preferable that the distance between axis A and blade center BC, i.e., distance ABC, is about 1.882 times the radius R. Accordingly, in a ten-inch miter saw, the distance ABC is about 9.41 inches.

It is also preferable that, during the chopping operation, the blade center BC reaches a point where the distance between the blade center BC and the plane 11P, i.e., distance BCBP, is about 0.57 times the radius R, or, in a ten-inch miter saw, about 2.85 inches.

Persons skilled in the art will note that such arrangement requires a substantial portion 14U of blade 14 to be plunged below plane 11P. It is preferable that the area of portion 14U is between about 14.4% and about 50% of the total blade area, and most preferably is at least about 15.75% of the total area. Accordingly, for a ten-inch blade having an area of about 50,670.75 squared millimeters (the areas of the arbor hole or of the space between blade teeth have not been subtracted), the area of portion 14U should be between about 7,296.60 squared millimeters and about 25,335.37 squared millimeters (the area of the spaces between blade teeth has not been subtracted). Preferably, the area of portion 14U is at least about 7,984 squared millimeters.

Persons skilled in the art will recognize that, with such arrangement, the table plane 11P intersects blade 14, forming a chord CA. The length of this chord CA may be at least 1.6 times the radius R. Preferably the length of chord CA is at least about 1.642 times the radius R, i.e., at least about 8.21 inches for a ten-inch blade. This chord length would constitute the cutting capacity, but for the placement of fences 20, 21. Accordingly, the cutting capacity would be the distance between the front endpoint of chord CA and the fence plane 20P, i.e., distance CC. Preferably, distance CC is at least 1.1 times the radius R. It is preferable that distance CC is at least about 1.236–1.252 times the radius R, or at least about 6.18–6.26 inches for a ten-inch blade. Preferably, distance CC is about 1.244 times the radius R, or about 6.22 inches for a ten-inch blade. It is also preferable that the ratio between distance CC and the length of chord CA is between about 0.60 and about 0.775, and preferably about 0.757.

With such arrangement, a ten-inch miter saw will be able to cut through nominal 4" by 4" and 2" by 6" wood beams, like most currently available ten-inch non-sliding miter saws. In addition, a ten-inch miter saw having such arrangement will be able to cut through boards that is 6 inches wide (true size) at 0° miter angle, and/or 5.25 inches wide at 31.62° miter angle, unlike any available ten-inch non-sliding miter saws.

Figure 2:
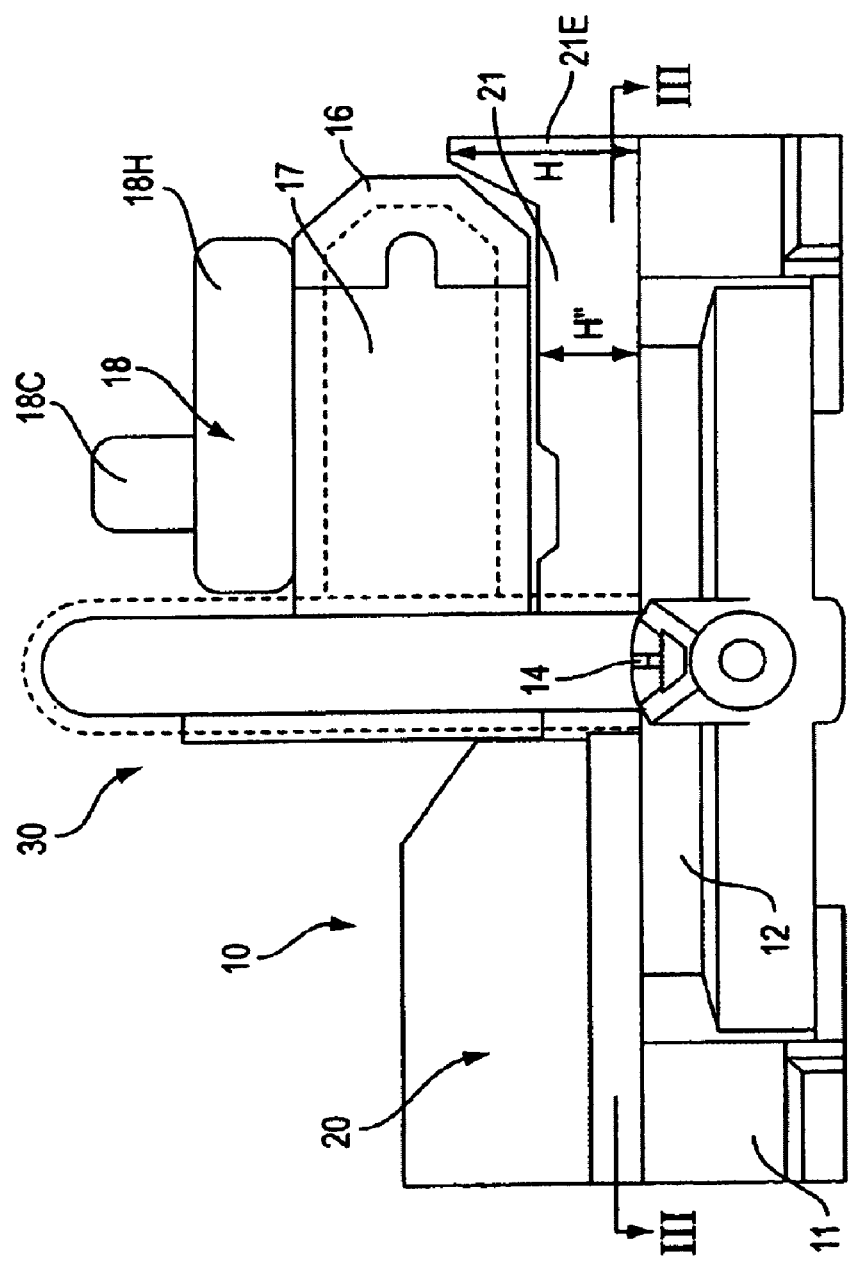
FIG. 2 is a front view of the miter saw.
Figure 3:
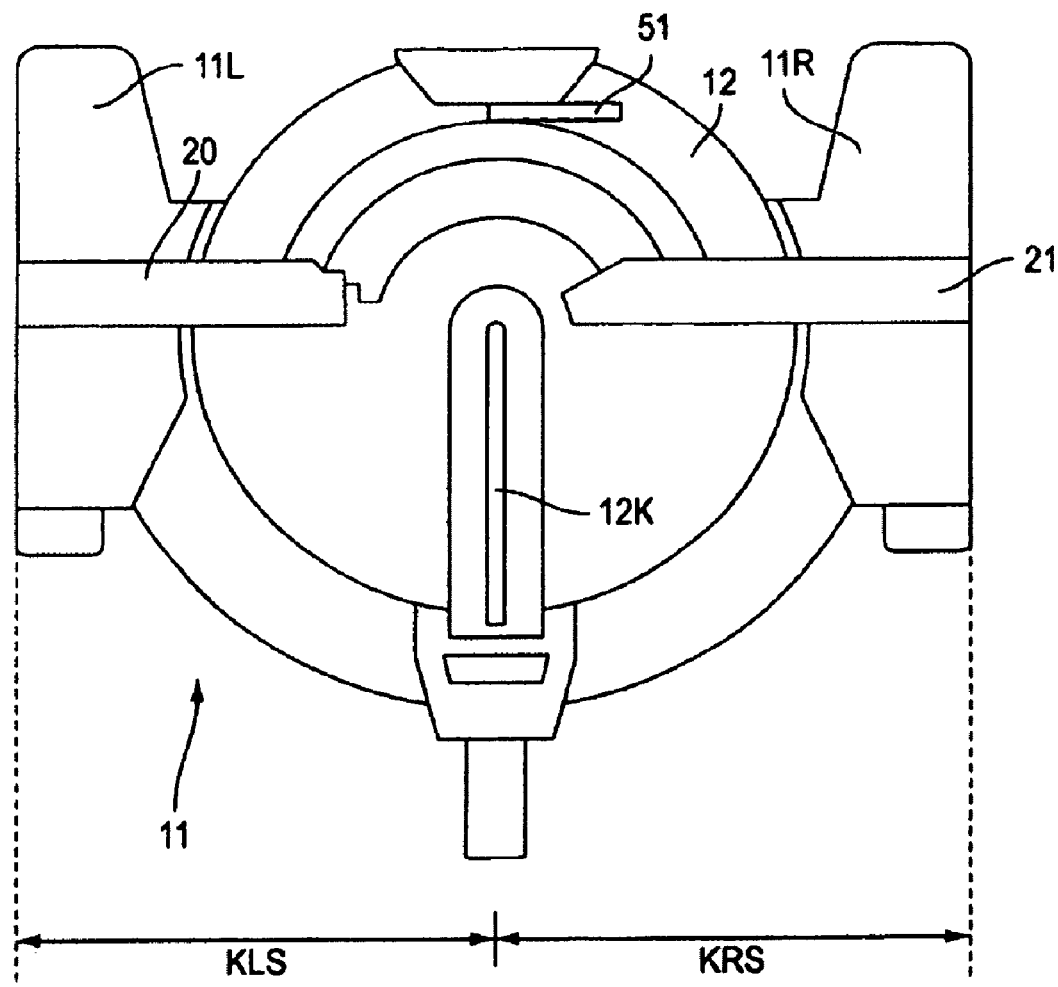
FIG. 3 is a top plan view of the miter saw along line III—III of FIG. 2.
Figure 7:
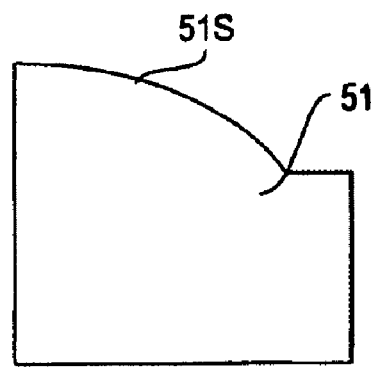
FIG. 7 shows part of a stop mechanism for use with the miter saw.
Figure 4:
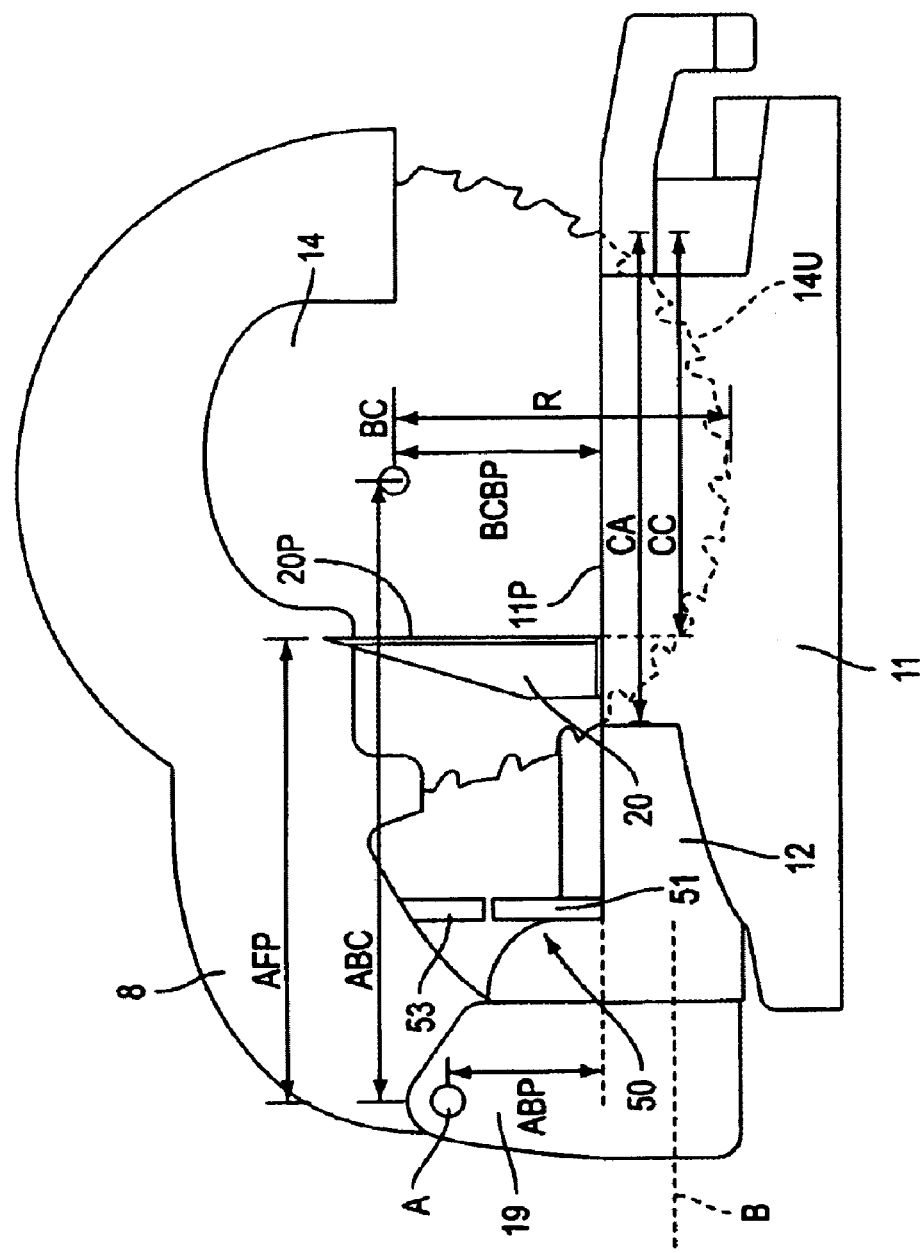
FIG. 4 is a left side view of the miter saw.
Figure 5:
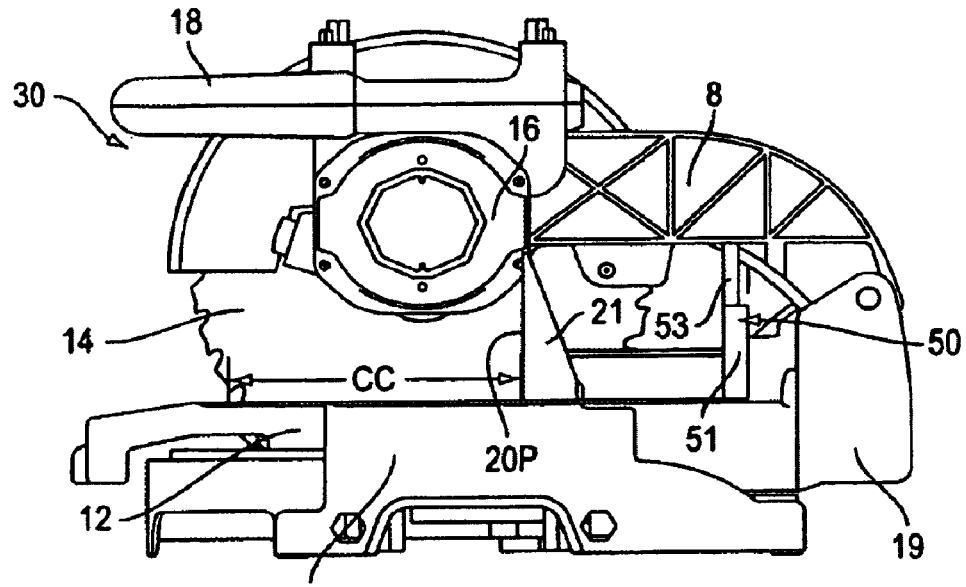
FIG. 5 is a right side view of the miter saw.
Figure 6:
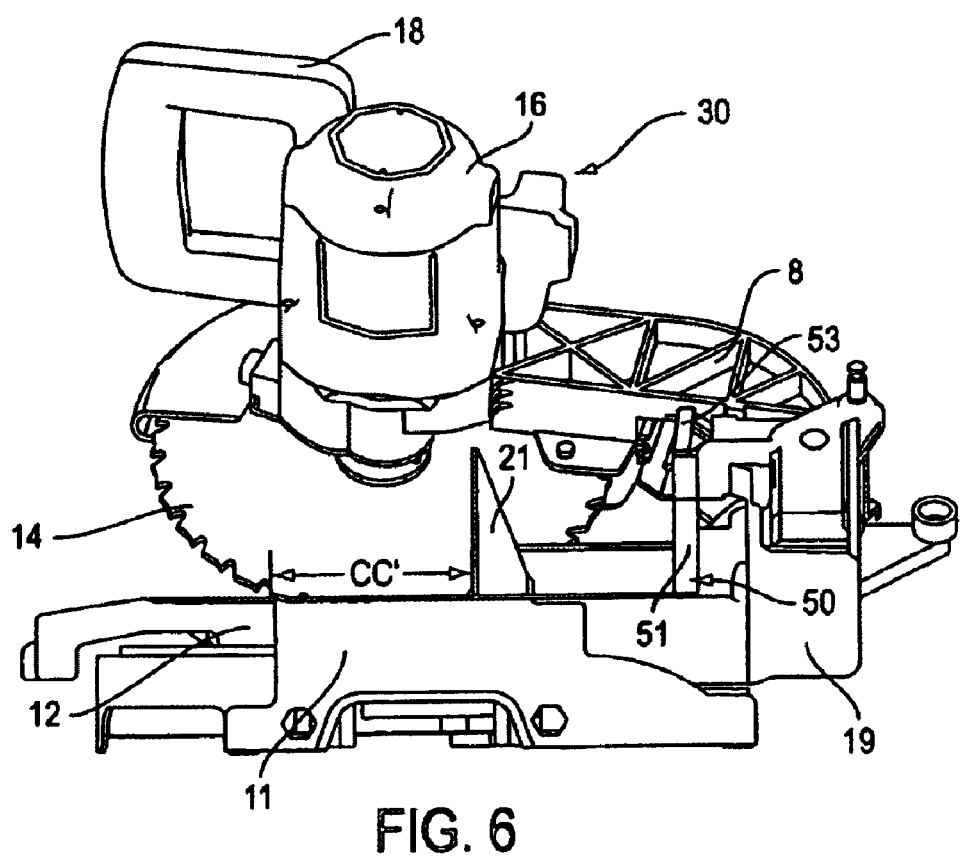
FIG. 6 is a right side view of the miter saw in a beveled position.

Referring to FIGS. 2–3 and 5, the motor housing 16 intersects the plane 20P when the saw assembly 30 is at the lowest chopping position and at a 0° miter and bevel angles. (Persons skilled in the art will recognize that such result may occur because of the arrangement discussed above.) In order to avoid contact between the motor housing 16 and fence 21, at least part of the fence 21 located underneath housing 16 is disposed with a height H', which is lower than the motor housing 16. It is also preferable to provide at least one portion 21E of fence 21 at height H, which is preferably higher than the housing 16, for better support of a taller workpiece. Accordingly, such portion 21E could be provided to the right of housing 16.

Such arrangement could result in a right fence 21 longer than the right fences found in most typical miter saws. According to typical miter saw design principles, the distance between the end of fence 21 and the kerf line 12K, i.e., the line defined by the intersection of plane 11P and blade 14, is about equal to the distance between the kerf line 12K and the end of the right side 11R, i.e., distance KRS. Similarly, the distance between the end of fence 20 and the kerf line 12K is about equal to the distance between the kerf line 12K and the end of left side 11L, i.e., distance KLS. Persons skilled in the art will recognize that this last principle is usually maintained in miters saws having sliding fence assemblies when the sliding fence is slid to the position closest to blade 14.

Furthermore, distance KLS is typically equal to distance KRS. Similarly, the distance between the end of fence 21 and the kerf line 12K is typically equal to the distance between the end of fence 20 and the kerf line 12K. Again, persons skilled in the art should recognize that this principle is typically maintained in a miter saw with a sliding fence assembly when the sliding fence is slid to the position closest to blade 14.

Accordingly, if the prior art design principles are followed, the left side 11L and/or fence 20 will be longer, because of the longer length of fence 21 and/or right side 11R. This however results in a larger, heavier base. Thus it is preferable to provide a base assembly 11 where the distance KRS is larger than the distance KLS. Similarly, it is preferable that the distance between the end of fence 21 and the kerf line 12K be larger than the distance between the end of fence 20 and the kerf line 12K. If the miter saw is provided with a sliding fence assembly, the distance between the end of fence 21 and the kerf line 12K may be larger than the distance between the end of fence 20 and the kerf line 12K, when the fence 20 is slid to the position closest to blade 14. In other words, the ratio between distances KRS and KLS is preferably larger than 1:1, and should be at least about 1.06:1. For a ten-inch miter saw built accordingly, the distances KRS and KLS may be about 267 millimeters and 251 millimeters, respectively.

Another aspect of the invention is shown in FIGS. 3–7. Preferably, miter saw 10 is provided with a stop mechanism 50. Stop mechanism 50 may comprise a movable stop 53 attached to saw assembly 30, and preferably attached to arm 8. In addition, stop mechanism 50 may include a fixed stop 51 disposed on base assembly 11, and preferably on table 12. As saw assembly 30 is pivoted in a chopping action, movable stop 53 contacts fixed stop 51, limiting any further pivoting of saw assembly 30.

Fixed stop 51 has a surface 51S for contacting movable stop 53. Preferably, surface 51S can be "programmed" so as to vary the chopping motion range for the saw assembly 30 at different bevel angles. For example, it may be desirable to provide the full chopping motion range when the saw assembly 30 is at a 0° bevel angle (as shown in FIG. 5), whereas the chopping motion range may be limited when the saw assembly 30 is at a 45° bevel angle. Persons skilled in the art will recognize that such result may be desirable in order to avoid contact between fence 20 and lower blade guard 15 when the saw assembly 30 is pivoted downwardly at a 45° bevel angle. Alternatively, such result may be desired in order to obtain a smaller cutting capacity CC'. Accordingly, fixed stop 51 can be programmed to obtain such result by providing an appropriate surface 51S, such as that shown in FIG. 7.

Persons skilled in the art will recognize that surface 51S may be programmed to obtain different results. For example, surface 51S may be programmed to limit the chopping motion range at other bevel positions in order to increase the height of fence 20.

Persons skilled in the art may recognize other alternatives to the means disclosed herein. However, all these additions and/or alterations are considered to be equivalents of the present invention.

What is claimed is:

1. A miter saw comprising:
   a base assembly;
   fence attached to the base assembly for supporting a work piece, the fence having a fence plane;
   a rotatable table rotatably connected to the base assembly, the table having a table plane for supporting the workpiece;
   a saw assembly including a motor and a blade driven by the motor, the blade having a radius and a blade center; and
   a pivot arm pivotally attached to the table and pivotally supporting the saw assembly about at a first axis substantially parallel to the table plane, allowing a user to plunge the blade below tie table plane;
   wherein distance between the first axis and the table plane is about 0.472 times the radius, distance between the first axis and the fence plane is about 1.45 times the radius, and distance between the first axis and the blade center is about 1.882 times the radius.

2. A The miter saw of claim 4,
   wherein area of the blade below the table plane when plunged is between about 14.4% and about 17.5% of total blade area.

3. The miter saw of claim 2, wherein the blade area below the table plane is about 15.75% of the total blade area.

4. The miter saw of claim 2, further comprising a sliding fence connected to the base assembly.

5. The saw of claim 1, wherein distance between the blade center and the table plane is about 0.57 times the radius when the blade is plunged below the table plane.

6. The saw of claim 1, wherein chord length of blade periphery plunged below the table plane is at least 1.6 times the radius.

7. The saw of claim 1, wherein chord of blade periphery plunged below the table plane has a first endpoint behind the fence and a second endpoint in front of the fence, and distance between the fence and the second endpoint is at least 1.1 times the radius.

8. The saw of claim 7, wherein the distance between the fence and the second endpoint is at least about 1.236 to about 1.252 times the radius.

9. The saw of claim 7, wherein the distance between the fence and the second endpoint is at least 1.244 times the radius.

10. The saw of claim 7, wherein the distance between the fence and the second endpoint is between about 0.60 and 0.775 times the chord length.

11. The saw of claim 7, wherein the distance between the fence and the second endpoint is about 0.757 times the chord length.

\* \* \* \* \*